United States Patent [19]
Abe

[11] Patent Number: 5,152,046
[45] Date of Patent: Oct. 6, 1992

[54] FASTENER TIGHTENING METHOD

[75] Inventor: Tetsuo Abe, Aichi, Japan

[73] Assignee: Sanyo Kiko Kabushiki Kaisha, Aichi, Japan

[21] Appl. No.: 749,512

[22] Filed: Aug. 19, 1991

Related U.S. Application Data

[63] Continuation of Ser. No. 602,585, Oct. 24, 1990, abandoned.

[51] Int. Cl.⁵ .............................................. B23Q 17/00
[52] U.S. Cl. .................................... 29/407; 29/525.1
[58] Field of Search ................... 29/407, 525.1, 705, 29/720, 240; 81/469; 173/1, 12

[56] References Cited

U.S. PATENT DOCUMENTS

| | | | |
|---|---|---|---|
| 4,095,325 | 6/1978 | Hashimoto et al. | 29/407 |
| 4,104,778 | 8/1978 | Vliet | 29/407 |
| 4,106,176 | 8/1978 | Rice et al. | 29/407 |
| 4,829,650 | 5/1989 | Galard | 29/407 |
| 4,908,926 | 3/1990 | Takeshima et al. | 29/407 |

Primary Examiner—Timothy V. Eley
Attorney, Agent, or Firm—Nikaido, Marmelstein, Murray & Oram

[57] ABSTRACT

There is disclosed a constant-speed, fastener tightening method using a nut runner for setting the final tightened state of the fastener in terms of tightening torque, characterized in that the fastener is tightened by maintaining the rotative speed of the nut runner at a constant speed regardless of variations in tightening loads.

3 Claims, 3 Drawing Sheets

FASTENER TIGHTENING METHOD

This application is a continuation of application Ser. No. 602,585 filed Oct. 24, 1990 and now abandoned.

BACKGROUND OF THE INVENTION

1. Field of the Invention

The present invention relates to a method of tightening fasteners such as bolts and nuts and more particularly it relates to prevention of variation in axial force during tightening fasteners using a nut runner.

2. Prior Art

In automobile engine assembling operation, automatic tightening of bolts and nuts by a nut runner is performed. As for means for bolting engine components, such as a cylinder head and a cylinder block, with a predetermined tightening torque, use is made of a first method (torque method) comprising the steps of presetting the final tightening torque for a nut runner, detecting the actual torque when a bolt is tightened, and terminating the bolt tightening operation using the nut runner when the final tightening torque equals the actual torque, and a second method (torque-angle method) comprising the steps of presetting a snug torque for a nut runner which is about one third as large as the final tightening torque and stopping the rotation after the snug point has been passed.

The torque method described above is intended to impart a predetermined tightening strength to the fastener by finding and controlling the tightening force on the fastener. However, the tightening strength is, in fact, determined by the size of the transmitted axial force (hereinafter referred to as the axial force). This axial force changes due to the friction coefficient for the screw surface and seat surface, so that in most cases the tightening torque and axial force do not have the same value. Therefore, even if the tightening torque is controlled to be constant, there sometimes occurs a dispersion in axial force which is as much as 100%, as shown in FIG. 5. Stated more quantitatively, between the tightening torque T and the axial force F, the following relations hold:

$$T = KDF \qquad (1)$$

$$F = \frac{T}{KD} \qquad (2)$$

(where D is the diameter of the fastener and K is a torque coefficient).

The friction coefficient $\mu$, which is a main element of the torque coefficient K not only varies greatly due to the characteristics of the seat surface for the fastener and the thread surface but also is influenced by the rotative speed at which the fastener is being tightened. That is, as shown in FIG. 6, the friction coefficient is high in the static friction region where the rotative speed of the nut runner is low (normally, 3 RPM or less) and is low in the dynamic friction region where the rotative speed of the nut runner is high. From this point of view, it is seen that in order to reduce the dispersion in axial force F, it is preferable to tighten fasteners in the dynamic region where friction coefficient $\mu$ exercises less influence and with a constant speed by using a nut runner. In the conventional torque method, however, the final tightening torque T is set in disregard of the relationship between axial force F and friction coefficient $\mu$, with the result that in the final period of bolt tightening operation when the snug point is passed, the rpm gradually decreases until the final tightening torque is reached. More particularly, in the conventional system, since the drive motor for the nut runner is driven at a given voltage without having its speed controlled, the rpm of the nut runner gradually decreases as the actual tightening torque increases. This indicates the series characteristic of DC motors; series motors and commutator motors having their speed uncontrolled exhibit such characteristics. Nut runners having their rpm uncontrolled are attended with a change in rpm, such a change in rpm influencing the friction coefficient to cause a dispersion in axial force. As shown in FIG. 6, when the rpm of the nut runner decreases to a point in the vicinity of the boundary between the dynamic and static friction regions, the change in friction coefficient $\mu$ suddenly increases, producing a large dispersion in axial force F.

Further, in the torque-angle method, since the snug point is set by torque, the same problems as described above arise.

SUMMARY OF THE INVENTION

As a means for solving the above mentioned problems, the present invention provides a fastener tightening method using a nut runner for setting the final tightened state of fasteners in terms of tightening torque, characterized in that fasteners are tightened with the rpm of the nut runner maintained constant regardless of variations in tightening loads.

Tightening a fastener while maintaining the rotative speed of a nut runner reduces the dispersion in friction coefficient, greatly decreasing the variation in axial force, as compared with the conventional method.

If the present invention is used in a nut runner used to tighten fasteners by the torque method, the dispersion in axial force will be remarkably decreased, as compared with the conventional method; thus, accurate bolt tightening operation can be performed.

DESCRIPTION OF THE PREFERRED EMBODIMENTS

Figure 2:
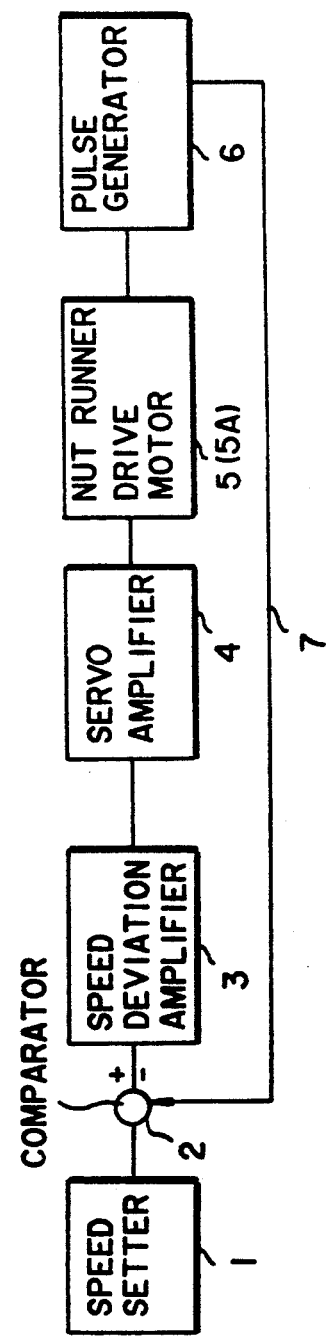
FIG. 2 is a block diagram showing an example of a constant speed driving device for nut runners.
Figure 3:
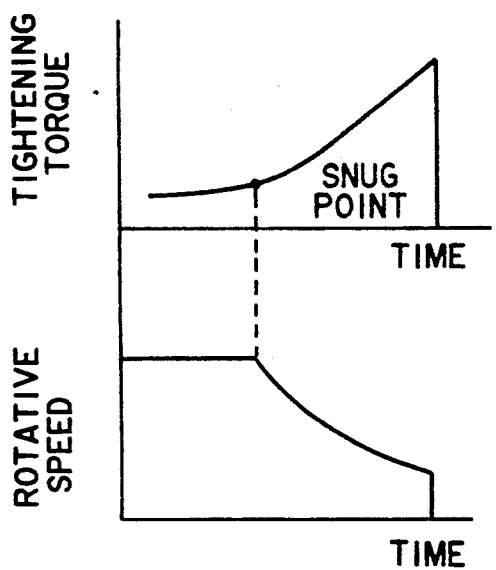
FIG. 3 shows a tightening torque versus time graph and a rotative speed versus time graph, showing the use of a conventional method.
Figure 4:
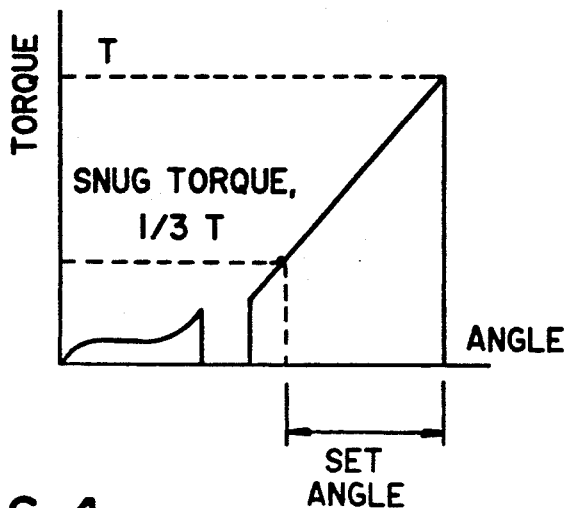
FIG. 4 is a torque versus angle graph in the torque-angle method.
Figure 5:
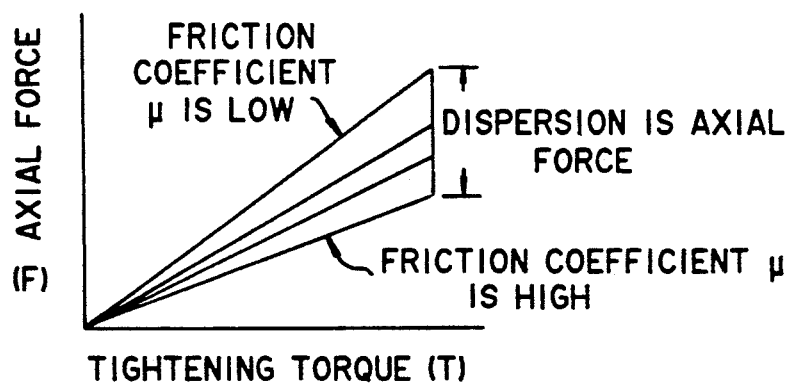
FIG. 5 is an axial force versus tightening torque graph in conventional method.
Figure 6:
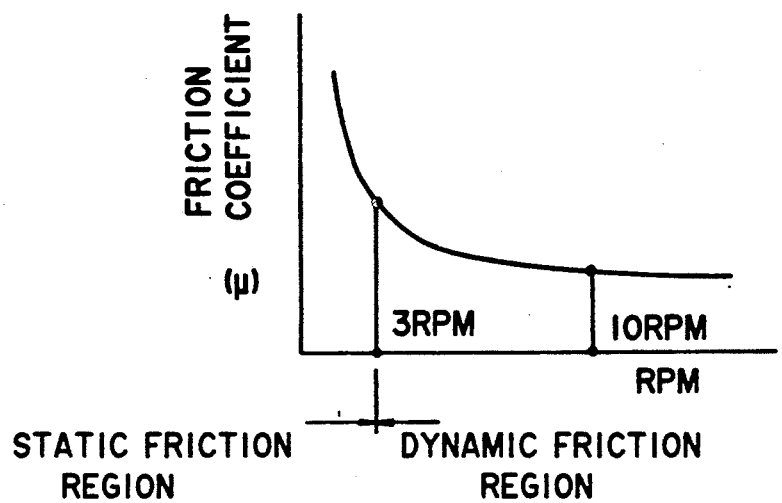
FIG. 6 is a friction coefficient versus rpm graph.

A constant speed driving device for nut runners, as shown in FIG. 2, comprises a speed setter 1, a comparator 2, a speed deviation amplifier 3, a servo amplifier 4, a nut runner drive motor 5 and a pulse generator 6. These components are connected in series, with a feedback circuit 7 disposed between the pulse generator 6 and the comparator 2.

Figure 1:
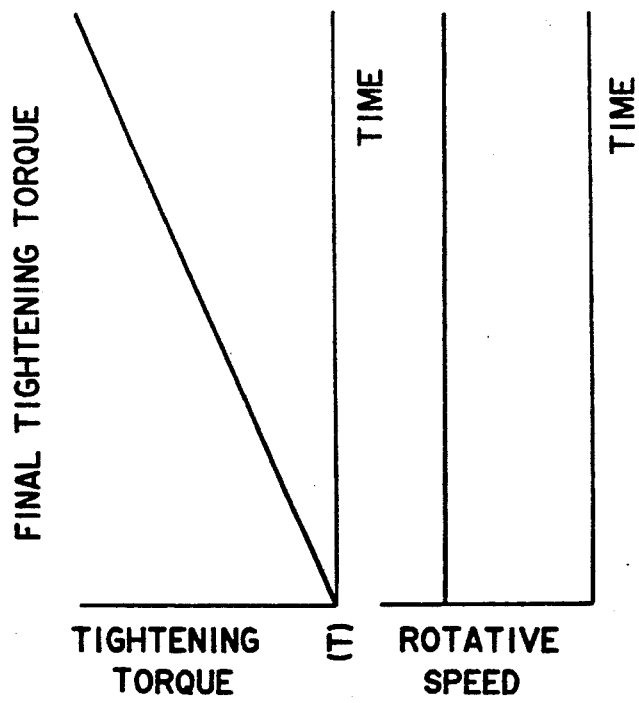
FIG. 1 shows a tightening torque versus time graph and a rotative speed versus time graph, showing an embodiment of the invention.

The rpm of an unillustrated nut runner is set in the speed setter 1. The set rpm is fed to the nut runner drive motor 5 successively through the comparator 2, speed deviation amplifier 3 and servo amplifier 4. A pulse signal corresponding to the actual rpm of the nut runner is sent from the pulse generator 6. The pulse signal is delivered to the comparator 2 through the feedback circuit 7. In the comparator 2, the pulse signal is compared with the set rpm delivered from the speed setter 1, and on the basis of the result of the calculation for comparison, a voltage or current conversion signal for correcting the rpm is sent from the speed deviation amplifier 5 and servo amplifier 4 to a control circuit 5A for the nut runner drive motor 5. The rpm to be set in the speed setter 1 is set as low as possible (for example, about 10 rpm) within the range in which the final tightening torque can be transmitted to the fastener in the dynamic friction region. Although the rpm of the nut runner can be maintained at an approximately constant value at least from the initial period of tightening of the fastener to the final period of tightening, as shown in FIG. 1, the total period of time required for tightening the fastener can be shortened if tightening is effected by retaining the constant rotation state at least from the time when the snug point is passed to the final period of tightening. In brief, according to the present invention, by maintaining the rpm of a nut runner at a constant speed regardless of variations in tightening loads, influences of dispersions in the friction coefficient are eliminated (i.e., a constant friction coefficient is maintained) and hence fastener tightening conditions having little variation in axial force can be secured.

What is claimed is:

1. A fastener tightening method for preventing variation of an axial force within a fastener comprising the steps of:
    rotating a fastener at a constant rotational speed to maintain a constant coefficient of friction between said fastener and a workpiece regardless of variations in tightening loads; and
    stopping the rotation of the fastener when a predetermined torque value is obtained.

2. A fastener tightening method for preventing variation of an axial force within a fastener comprising the steps of:
    rotating a fastener at a constant rotational speed regardless of variations in tightening loads, wherein said constant rotational speed is maintained from an initial period of tightening the fastener to a final period of tightening the fastener; and
    stopping the rotation of the fastener when a predetermined torque value is obtained.

3. A fastener tightening method for preventing variation of an axial force within a fastener comprising the steps of:
    rotating a fastener at a constant rotational speed regardless of variations in tightening loads, wherein said constant rotational speed is maintained from when a snug point is passed until a final period of tightening the fastener; and
    stopping the rotation of the fastener when a predetermined torque value is obtained.

* * * * *